United States Patent
Haghverdi et al.

(10) Patent No.: US 12,463,419 B2
(45) Date of Patent: Nov. 4, 2025

(54) METHOD AND PROCESSING UNIT FOR CHECKING AN OVERVOLTAGE PROTECTION CIRCUIT FOR AN ELECTRIC MACHINE, AND CONVERTER ARRANGEMENT

(71) Applicant: SEG Automotive Germany GmbH, Stuttgart (DE)

(72) Inventors: Kaveh Haghverdi, Stuttgart (DE); Murugaperumal Devaraja, Stuttgart (DE); Nima Saadat, Stuttgart (DE); Vivek Tailor, Stuttgart (DE); Timm Lohmann, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 158 days.

(21) Appl. No.: 18/542,350

(22) Filed: Dec. 15, 2023

(65) Prior Publication Data
US 2024/0204514 A1 Jun. 20, 2024

(30) Foreign Application Priority Data
Dec. 16, 2022 (DE) .......................... 102022133639.5

(51) Int. Cl.
*H02H 9/04* (2006.01)
*H02H 7/12* (2006.01)

(52) U.S. Cl.
CPC .............. *H02H 9/042* (2013.01); *H02H 7/12* (2013.01)

(58) Field of Classification Search
CPC ...... H02H 1/0007; H02H 3/20; H02H 7/0833; H02H 7/1222; H02H 9/042
(Continued)

(56) References Cited

U.S. PATENT DOCUMENTS 3,943,427 A * 3/1976 Tolstov .................... H02H 7/12
361/91.8
5,570,260 A * 10/1996 Kanai ................... H02M 1/088
361/91.8
(Continued)

FOREIGN PATENT DOCUMENTS

DE 4436858 A1 4/1996
DE 102010004214 A1 7/2011
(Continued)

OTHER PUBLICATIONS

Machine translation of Henmi et al. Japanese Patent Document JP 2019-146392 A Aug. 2019 (Year: 2019).*

*Primary Examiner* — Kevin J Comber
(74) *Attorney, Agent, or Firm* — Cozen O'Connor

(57) ABSTRACT

An overvoltage protection circuit for an electric machine has a series connection of at least two overvoltage protection units, each having a switching unit connected in parallel. Each overvoltage protection unit includes at least one overvoltage protection component that limits a voltage, dropping across this component, to a component voltage limit. At least one of the overvoltage protection units includes at least two overvoltage protection components. A voltage tap is provided between two of overvoltage protection components. A method of checking the overvoltage protection circuit includes detecting a voltage present at the overvoltage protection circuit, switching the switching units into different switching configurations and determining a measured value of a voltage present at the voltage tap in each of the switching configurations, comparing the measured values in each case to an associated comparative value, and determining the functionality of the overvoltage protection circuit based on comparison result.

14 Claims, 3 Drawing Sheets

(58) Field of Classification Search
USPC .......................................................... 361/91.1
See application file for complete search history.

(56) References Cited

U.S. PATENT DOCUMENTS

| | | | | |
|---|---|---|---|---|
| 5,815,353 A | * | 9/1998 | Schwenkel | H02H 9/04 |
| | | | | 361/111 |
| 2013/0182471 A1 | * | 7/2013 | Schwarz | H02M 1/34 |
| | | | | 361/91.5 |

FOREIGN PATENT DOCUMENTS

| | | | |
|---|---|---|---|
| DE | 102021133298 A1 | | 6/2023 |
| JP | 2019146392 A | * | 8/2019 |
| WO | WO 2012/113769 A1 | | 8/2012 |
| WO | WO 2016/050907 A2 | | 4/2016 |

* cited by examiner

METHOD AND PROCESSING UNIT FOR CHECKING AN OVERVOLTAGE PROTECTION CIRCUIT FOR AN ELECTRIC MACHINE, AND CONVERTER ARRANGEMENT

CROSS-REFERENCE TO RELATED APPLICATIONS

This application claims priority to German Patent Application No. DE 102022133639.5 filed Dec. 16, 2022, titled "A Diagnosis Methode for TVS Diodes Used in DC Link Overvoltage Protection Mode," which is hereby incorporated by reference in its entirety.

TECHNICAL FIELD

The present invention relates to a method for checking an overvoltage protection circuit for an electric machine, a processing unit for carrying out the method, and a converter arrangement.

BACKGROUND

Electric machines may be used to drive a vehicle. A converter (or inverter) is customarily used to activate or operate the electric machine, and in particular with regard to phases of the stator winding. Typical electric machines have, for example, three, five, seven, or even more phases. For this purpose, for each phase the converter generally has one half bridge, which in turn includes in each case two switching elements, for example MOSFETs, IGBTs, or other semiconductor components. In addition, an activation device that is used to activate the individual switching elements of the half bridges may be present; these involve gate driver circuits, for example. In this way, for example a direct voltage that is provided by a vehicle electrical system or a battery may be converted into an alternating voltage for the stator winding.

The semiconductor switches and the gate drivers as well as a field excitation circuit of the rotor that may be present are supplied with power from the DC link. Thus, overvoltage protection may be provided to prevent the DC link voltage from increasing above a specified limit value.

A converter may therefore have protective functions for protecting the system from anomalous conditions such as overvoltage. When these protective functions detect an error, a shutdown path may be activated to bring the system into a secure state. In order to also prevent damage during such a transition, an additional fast-response overvoltage protection may be provided to limit the voltage amplitude or voltage peaks on the DC link. Diodes such as suppressor diodes (TVS diodes) or Zener diodes may be used for this purpose.

DE 44 36 858 A1 discloses a surge arrester made up of multiple individual elements connected in series. A chain of controlled switches is situated in parallel to this chain made up of limiting elements. The two chains are interconnected in the manner of a rope ladder, so that individual limiting elements can be tested by closing the switches. The dimensioning of the limiting elements is selected in such a way that each limiting element has a breakdown voltage or forward voltage that is less than the lowest expected operating voltage at the surge arrester.

SUMMARY

Proceeding from this prior art, a method for checking an overvoltage protection circuit for an electric machine, a processing unit for carrying out the method, and a converter arrangement having the features of the independent claims are proposed. Advantageous embodiments are the subject matter of the subclaims and of the following description.

The invention provides a simple and reliable option for checking the functionality of an overvoltage protection circuit. If it is determined that the overvoltage protection circuit is not functional, in particular operation of the electric machine may be prevented, for example by preventing or terminating the output of alternating voltage to the electric machine. In particular, the method is carried out in a state in which alternating voltage has not (yet) been output to the electric machine or generated by the electric machine, in particular before alternating voltage is output or generated. In contrast, if it is determined that the overvoltage protection circuit is functional, in particular operation of the electric machine or a system containing it, such as a vehicle, may be started or continued.

The overvoltage protection circuit used within the scope of the invention has in particular two direct voltage terminals, and is configured to limit a voltage between these two direct voltage terminals to an overall voltage limit. For this purpose, the overvoltage protection circuit has a series connection of at least two overvoltage protection units, a switching unit being connected in parallel to each of the at least two overvoltage protection units, so that the particular overvoltage protection unit is bridged by closing the switching unit. It may be provided that the bridging has an electrical resistance greater than zero in order to limit a current flow through the switching unit. In one embodiment, the switching unit includes a switching element, in particular a semiconductor switching element, for example a MOSFET or IGBT, and a resistor component for limiting a current flow through the switching element.

In addition, each of the at least two overvoltage protection units includes at least one overvoltage protection component, each overvoltage protection component limiting a voltage, dropping across this component, to a component voltage limit. In one embodiment, an overvoltage protection component includes a diode, in particular a suppressor diode or Zener diode, or is such a diode. Diodes having a breakdown voltage, such as Zener diodes or suppressor diodes, are particularly well suited for overvoltage protection, the component voltage limit being determined by the breakdown voltage. The above-mentioned overall voltage limit is a function in particular of the component voltage limits in question, and is the sum of these limits, for example.

At least one of the at least two overvoltage protection units includes at least two overvoltage protection components. In addition, a voltage tap is provided between two of these at least two overvoltage protection components of the at least one overvoltage protection unit, so that different voltage values between the voltage tap and one of the direct voltage terminals of the overvoltage protection circuit, in particular a ground connection, are measurable as a function of the switching states of the switching units. This at least one overvoltage protection unit is also referred to below as a "second overvoltage protection unit."

To check the functionality of the overvoltage protection circuit, a voltage present at the overvoltage protection circuit or between the direct voltage terminals is detected. This has an effect on the voltage that is measurable at the voltage tap. The at least two switching units are switched into at least two different switching configurations, and a measured value of a voltage present at the voltage tap is determined or measured in each of the at least two different switching configurations and compared to an associated comparative value that is determined as a function of the voltage present and the component voltage limits. Depending on the switching configuration, the component voltage limits, and the voltage present, among other things, certain measured values are expected for certain switching configurations (within tolerances), so that the functionality of the overvoltage protection circuit may be determined based on at least one comparison result. In general, different switching configurations involve different permutations of switching states of the switching units.

By use of the invention, voltage peaks in the DC link may be limited to allowable values, which prevents other safety mechanisms, which, for example, transfer the electric machine into a secure state (i.e., usually a nonfunctioning state), from responding prematurely. Unnecessary down times or stoppages may be reduced. The invention protects the converter of the electric machine from overvoltage before a primary safety mechanism is activated. The functionality of the overvoltage protection circuit may be easily checked prior to each start-up of the electric machine or the system containing it. The time requirements for the start-up test may be greatly reduced (due to only one point measurement).

In contrast to DE 44 36 858 A1, the number of interconnections and switching units is reduced, since at least two overvoltage protection components are combined in an overvoltage protection unit. In addition, the number of measuring points (voltage taps) is reduced, in one preferred embodiment, to exactly one. Furthermore, voltage measurement is advantageous compared to current measurement, since no additional measuring shunts are required. The approach may thus be implemented much more easily and cost-effectively.

In one embodiment, it is determined that the overvoltage protection circuit is not functional if at least one measured value does not agree with the associated comparative value within an allowable tolerance. This occurs in particular when at least one component voltage limit does not correspond to the expected value, so that it may be assumed that a defect or damage of at least one overvoltage protection component is present. As mentioned above, an (appropriate) measure is then advantageously taken which is selected, for example, from stopping or ending a start of an operation or a commenced operation of the electric machine, preventing or ending energization of the electric machine, outputting an error message, bringing the electric machine into a secure state, or ending a start of an operation or a commenced operation of a system in which the electric machine is installed, for example a vehicle.

In one embodiment, it is determined that the overvoltage protection circuit is functional if at least one measured value agrees with the associated comparative value within an allowable tolerance. In this case, all component voltage limits correspond to the expected value.

In one embodiment, the overvoltage protection circuit has exactly two overvoltage protection units. Overvoltage protection may thus be achieved with very few elements, and at the same time the effort for the functionality check may be kept low.

In one embodiment, the overvoltage protection circuit includes exactly three overvoltage protection components. Overvoltage protection may thus be achieved with very few elements, and at the same time the effort for the functionality check may be kept low, and in addition the number of components subject to tolerances is manageable.

In one embodiment, the overvoltage protection circuit includes exactly two overvoltage protection units, a first of which has exactly one overvoltage protection component, and a second (referred to above as the "at least one" overvoltage protection component) of which has exactly two overvoltage protection components. This represents an embodiment that has proven to be particularly practical and reliable.

In one embodiment, the overvoltage protection circuit has exactly one voltage tap that is situated between the two overvoltage protection components of the second overvoltage protection unit described above. The number of required measuring points for diagnostic purposes may be reduced to only one point when three overvoltage protection components are used.

In one embodiment, the at least two different switching configurations are selected from a first switching configuration in which a first of the at least two switching units is closed (conductive) and a second of the at least two switching units is open (nonconductive), a second switching configuration in which the first of the at least two switching units is open and the second of the at least two switching units is closed, and a third switching configuration in which the first of the at least two switching units is open and the second of the at least two switching units is open. These configurations are easily created, and cover numerous possible embodiments regarding the number of overvoltage protection units and overvoltage protection components.

In one embodiment, nominal values, for example from data sheets, may be used for the values of the component voltage limits. In such a case, the tolerances are to be appropriately selected so that component tolerances and temperature tolerances may be taken into account.

In one embodiment, the values for the component voltage limits of the overvoltage protection components are determined, for example each time the method starts to be carried out. In this way, the required tolerances may be reduced, and the result may be improved or the accuracy increased. This may be a computerized determination which in particular takes a present temperature into account. It is known that, for example, the breakdown voltage of diodes is a function of the present temperature.

In one embodiment, for this purpose a present temperature is determined, for example by means of a temperature sensor, from which a present temperature of the overvoltage protection components may be derived. It is advantageous to detect the temperature, to the greatest extent possible, at or near the overvoltage protection components. The component voltage limits are determined as a function of the temperature.

A processing unit according to the invention, for example an integrated circuit (such as an IC or ASIC), is configured, in particular by programming and/or by use of hardware, to carry out a method according to the invention. The at least two switching units may in particular also be part of the processing unit.

Further advantages and embodiments of the invention result from the description and the appended drawings.

The invention is schematically illustrated in the drawings, based on exemplary embodiments, and described below with reference to the drawings.

DETAILED DESCRIPTION

Figure 1:
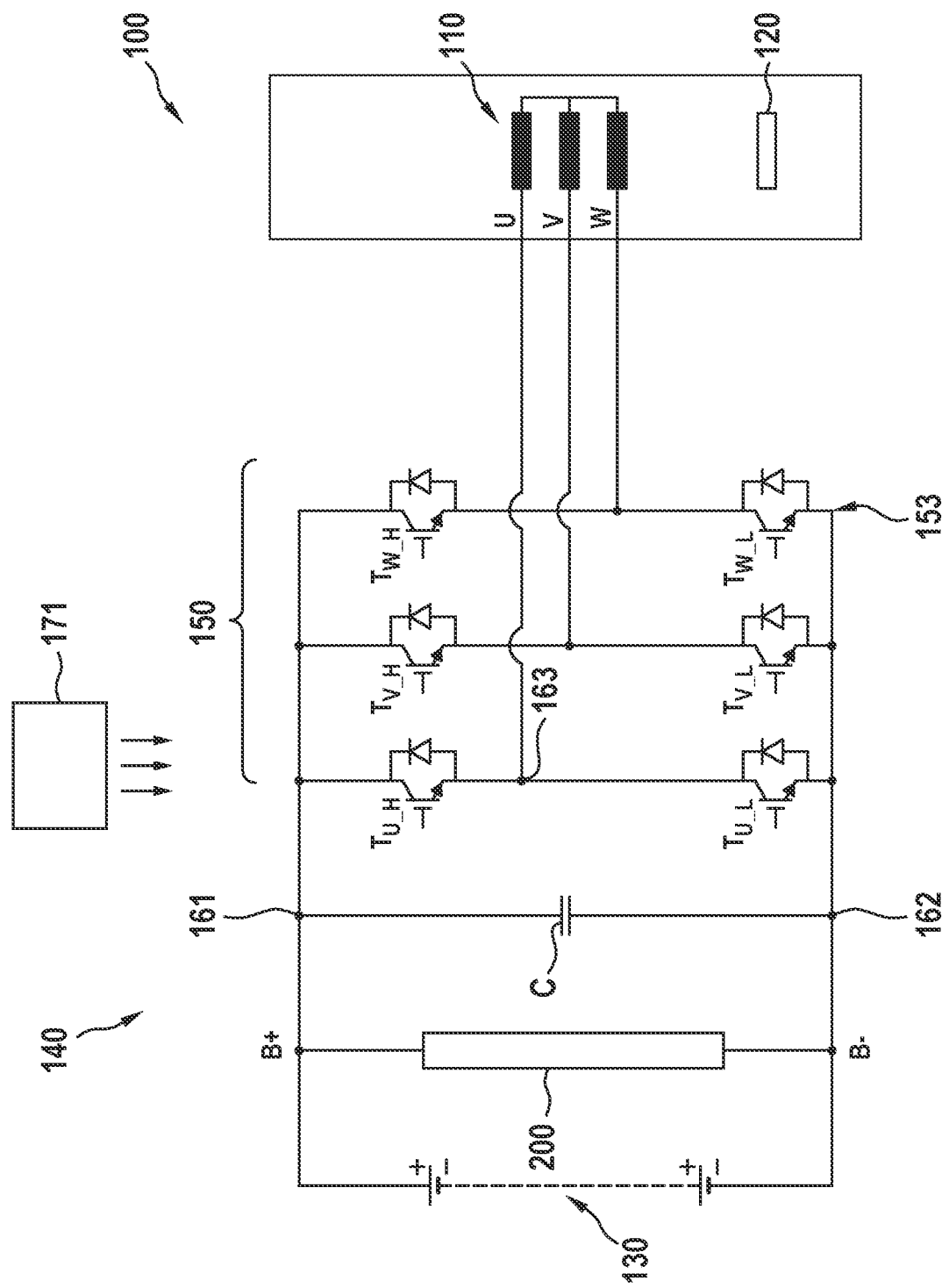
FIG. 1 schematically shows an electric machine including a converter and an overvoltage protection circuit according to one embodiment of the invention.

FIG. 1 schematically shows, in the manner of a circuit diagram, an electric machine 100 with a converter 140 and an overvoltage protection circuit 200 according to one embodiment of the invention. The electric machine 100 includes, by way of example, a stator or a stator winding 110 with three phases U, V, W, and a permanently excited (and/or separately excited) rotor 120. It is pointed out that the number of phases is not to be regarded as limiting, and that it is also possible, for example, to use more than three phases, for example four, five, six, etc., phases. In addition, by way of example a battery 130 is provided, having a positive supply terminal B+ and a negative supply terminal B− (ground), to which the converter 140 is attached. For example, this may represent an electrical system, such as for a system or a vehicle. The overvoltage protection circuit 200 is connected between the positive and the negative supply terminals.

The converter 140 has three half bridges 150 corresponding to the three-phase electric machine. As an example, one half bridge is denoted by reference numeral 153. The half bridge 153 has a switch TU_H on one side of a positive terminal 161 (i.e., on the positive terminal side, high side), which is to be connected to the positive supply terminal B+, a switch TU_L on a side of a negative terminal 162 (i.e., on the negative terminal side, low side), which is to be connected to the negative supply terminal B−, and a phase terminal 163 (alternating voltage terminal) between the two switches TU_H and TU_L, which is to be connected to the phase U of the stator winding 110. The same applies for the other two half bridges (without reference numerals). The switches may be designed as MOSFETs or IGBTs, for example. In addition, by way of example a DC link capacitor C is provided between the positive terminal 161 and the negative terminal 162.

Furthermore, the converter 140 includes an activation device 171, for example a driver circuit, by means of which the switches of the individual half bridges (two switches for each half bridge) of the group 151 may be activated, i.e., opened and closed.

Figure 2:
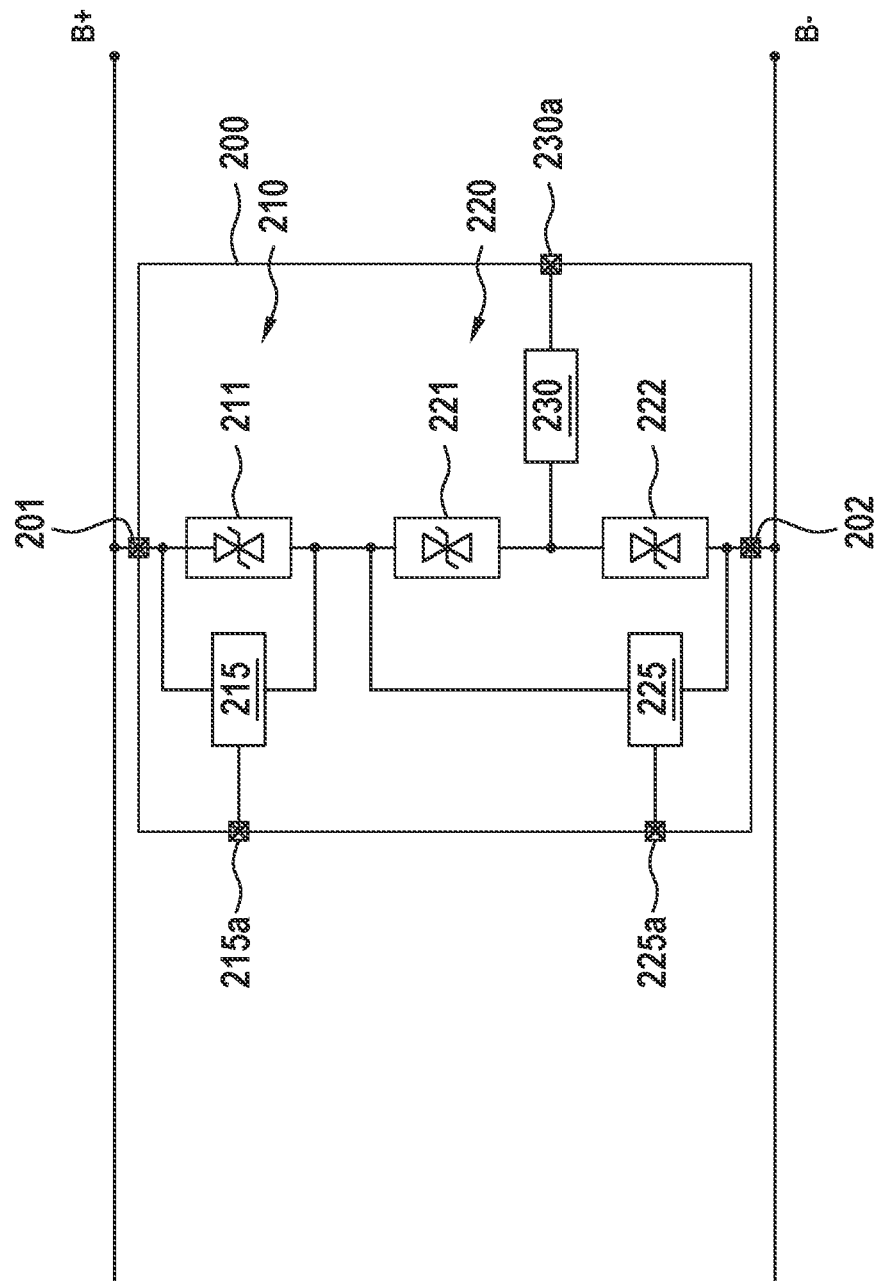
FIG. 2 schematically shows an overvoltage protection circuit according to one embodiment of the invention.

FIG. 2 schematically illustrates, in the manner of a circuit diagram, one embodiment of an overvoltage protection circuit that can be used in an electric machine, for example the electric machine 100 according to FIG. 1. The overvoltage protection circuit has two direct voltage terminals 201, 202, and is configured to limit a voltage between these two direct voltage terminals to an overall voltage limit. For this purpose, the overvoltage protection circuit has a series connection of two, as in the example shown, overvoltage protection units 210, 220, the overvoltage [protection] unit 210 including a suppressor diode 211 as an overvoltage protection component, and the overvoltage [protection] unit 220 including a suppressor diode 221 and a suppressor diode 222 as overvoltage protection components. Each of the suppressor diodes 211, 221, and 222 has a breakdown voltage which in each case denotes a component voltage limit of the suppressor diode. The overall voltage limit of the overvoltage protection circuit 200 is given as the sum of the three component voltage limits.

Connected in parallel to the overvoltage protection unit 210 is a switching unit 215, and to the overvoltage unit 220, a switching unit 225. Each of the switching units 215, 225 may in particular include a switching element, for example in the form of a MOSFET, and a resistor component connected thereto in series for limiting the current flow.

The respective associated overvoltage unit 210 or 220, more precisely, the suppressor diodes 211 or 221 and 222, may be bridged by closing or conductively switching the switching unit 215 or 225. The switching units 215, 225 are activatable via switching terminals 215a, 225a.

A voltage tap, which in the present example has a voltage measuring circuit 230 with an associated voltage sensor output 230a, is provided between the suppressor diodes 221 and 222. The voltage measuring circuit 230 may carry out, for example, voltage division, amplification, smoothing, etc. It is understood that the voltage tap may instead be placed directly on the output 230a. It is pointed out that the elements 215, 225, and 230 in particular may also be integral parts of a processing unit that is configured to carry out the method; i.e., the processing unit is connected directly to the series connection of the diodes via corresponding terminals.

Figure 3:
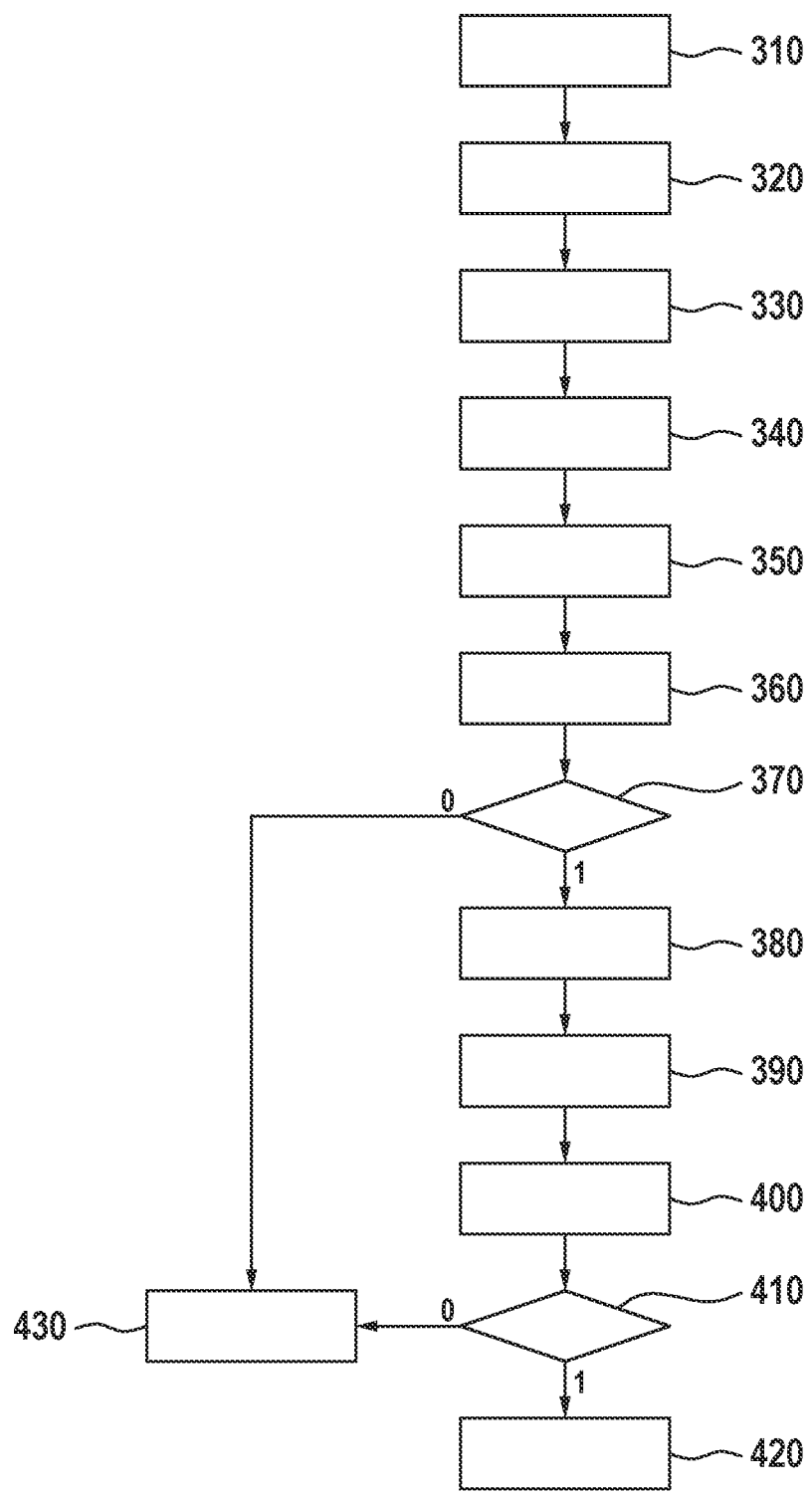
FIG. 3 shows a block diagram of one embodiment of a method according to the invention.

One embodiment of a method according to the invention is described below with reference to FIGS. 2 and 3. In particular, an embodiment is described in which two different switching configurations are created and measured.

In a first switching configuration, a first (upper) overvoltage protection unit 210 is bridged by activating the switching unit 215, and a second (lower) overvoltage protection unit 220 is not bridged. The functionality or error-free state of the middle suppressor diode 221 and of the lower suppressor diode 222 may be checked in this way.

In a second switching configuration, the first overvoltage protection unit 210 is not bridged, and the second overvoltage protection unit 220 is bridged by activating the second switching unit 225. The functionality or error-free state of the upper suppressor diode 211 may be checked in this way.

For each circuit configuration, a voltage value is detected at the output 230a and compared to a comparative value. If the measured value does not agree with the associated comparative value within a tolerance, the overvoltage protection unit is assessed as faulty and a measure is carried out. This measure may involve, for example, preventing the electric machine from operating and/or preventing a system, for example a vehicle, in which the electric machine is installed from operating. In particular, an internal combustion engine of the vehicle may be prevented from starting.

The measurable voltages for different circuit configurations and error cases are illustrated in the following table. The states of the suppressor diodes are listed in the "Diode state" column, and are designated as normal "N", nonconductive "O" (open), and continuously nonconductive "S" (short). The symbol "?" designates an arbitrary state.

The "Switching configuration L/H" column indicates the activation state of the upper (H) and lower (L) switching units, where "1" means that the switching unit is activated and the corresponding overvoltage protection unit is bridged, and "0" means that the switching unit is not activated and the corresponding overvoltage protection unit is not bridged.

The reference symbol Vdc denotes the voltage present between the direct voltage terminals, which is measured at the start of the method. In a typical application, Vdc in a vehicle may be 48 V, for example. Vclamp_D1, Vclamp_D2, and Vclamp_D3 denote the respective component voltage limits of the suppressor diodes 211, 221, 222, which in the example shown are selected to be 24 V, 13 V, and 16 V, respectively, resulting in an overall voltage limit of 53 V. In this case, a tolerance of ±4 V, for example, may be selected. However, it is emphasized that the numerical values are strictly examples and not to be construed as limiting.

The error-free state is shown in row 1.

TABLE 1

Measurable voltages for different circuit configurations and diode errors

| Diode state | Switching configuration L/H | Voltage at the voltage tap |
|---|---|---|
| 1 N—N—N (error-free) | 1/0 | Vdc − [Vclamp_D1 (24 V) + Vclamp_D2 (13 V)] |
|  | 0/1 | Vclamp_D3 (16 V) |
|  | 0/0 | Vdc − [Vclamp_D1 (24 V) + Vclamp_D2 (13 V)] |
| 2 ?-?-S | 1/0 | 0 V |
| ?-O-? | 0/1 | 0 V |
|  | 0/0 | 0 V |
| 3 N—S—N | 1/0 | Vclamp_D3 (16 V), if Vdc > Vclamp_D1 (24 V) + Vclamp_D3 (16 V) Vdc − [Vclamp_D1 (24 V)], if Vdc < Vclamp_D1 (24 V) + Vclamp_D3 (16 V) |
|  | 0/1 | Vclamp_D3 (16 V) |
|  | 0/0 | Vclamp_D3 (16 V), if Vdc > Vclamp_D1 (24 V) + Vclamp_D3 (16 V) Vdc − [Vclamp_D1 (24 V)], if Vdc < Vclamp_D1 (24 V) + Vclamp_D3 (16 V) |
| 4 S—N—N | 1/0 | Vclamp_D3 (16 V), if Vdc > Vclamp_D2 (13 V) + Vclamp_D3 (16 V) Vdc − [Vclamp_D2 (13 V)], if Vdc < Vclamp_D2 (13 V) + Vclamp_D3 (16 V) |
|  | 0/1 | Vclamp_D3 (16 V), if Vdc > Vclamp_D2 (13 V) + Vclamp_D3 (16 V) Vdc − [Vclamp_D2 (13 V)], if Vdc < Vclamp_D2 (13 V) + Vclamp_D3 (16 V) |
|  | 0/0 | Vclamp_D3 (16 V), if Vdc > Vclamp_D2 (13 V) + Vclamp_D3 (16 V) Vdc − [Vclamp_D2 (13 V)], if Vdc < Vclamp_D2 (13 V) + Vclamp_D3 (16 V) |
| 5 S—S—N | 1/0 | Vclamp_D3 (16 V) |
|  | 0/1 | Vclamp_D3 (16 V) |
|  | 0/0 | Vclamp_D3 (16 V) |
| 6 N—N—O | 1/0 | Vdc − [Vclamp_D1 (24 V) + Vclamp_D2 (13 V)] |
|  | 0/1 | Vdc − [Vclamp_D1 (24 V) + Vclamp_D2 (13 V)] |
|  | 0/0 | Vdc − [Vclamp_D1 (24 V) + Vclamp_D2 (13 V)] |
| 7 O—N—N | 1/0 | 0 V |
|  | 0/1 | Vclamp_D1 (24 V) |
|  | 0/0 | 0 V |
| 8 O—N—O | 1/0 | 0 V |
|  | 0/1 | Vdc − [Vclamp_D2 (13 V)] |
|  | 0/0 | 0 V |
| 9 S—S—O | 1/1 | Vdc |
|  | 0/1 | Vdc |
|  | 0/0 | Vdc |
| 10 O—S—O | 1/0 | 0 V |
|  | 0/1 | Vdc |
|  | 0/0 | 0 V |
| 11 N—S—O | 1/0 | Vdc − [Vclamp_D1 (24 V)] |
|  | 0/1 | Vdc |
|  | 0/0 | Vdc − [Vclamp_D1 (24 V)] |
| 12 S—N—O | 1/0 | Vdc − [Vclamp_D2 (13 V)] |
|  | 0/1 | Vdc − [Vclamp_D2 (13 V)] |
|  | 0/0 | Vdc − [Vclamp_D2 (13 V)] |
| 13 O—S—N | 1/0 | 0 V |
|  | 0/1 | Vclamp_D3 (16 V) |
|  | 0/0 | 0 V |

It is apparent that the functionality of the overvoltage protection circuit 200 may be determined quickly and easily via the illustrated embodiment of the method.

In this regard, the voltage Vdc present between the positive and the negative supply voltage terminal B+ or B−, respectively, is initially determined in a step 310.

A temperature is determined in an optional step 320, from which a temperature T of the suppressor diodes may be derived. For example, a temperature sensor may be provided for this purpose on the circuit carrier on which the suppressor diodes are situated, in the vicinity of the suppressor diodes or in thermal contact with one or more of same.

The respective component voltage limits Vclamp_D1, Vclamp_D2, Vclamp_D3 are determined in a step 330 as a function of the ascertained temperature T. For example, the following relationship may be used:

$$Vclamp(T) = Vclamp(25° C.) \times (1 + \alpha T \times (T - 25K))$$

where $\alpha = 0.08\%$ and Vclamp(25° C.) is the breakdown voltage at 25° C.

In a step 340, the first switching unit 215 is closed (state "1") and the second switching unit 225 is open (state "0").

After a sufficient waiting period (step 350) of a minimum of 50 microseconds, for example, which corresponds to three times an output filter time constant of the voltage measuring circuit 230, the voltage present at the output 230a is measured in a step 360.

The measured voltage is compared to a comparative value in a step 370, the comparative value being determined as a function of the measured voltage that is present (step 310) and the determined component voltage limit (step 330) (see table). If the two values do not agree within an allowable tolerance, branch "0", the method is ended in step 430 and the electric machine and/or the system containing it is brought into a secure state.

If the values agree within the tolerance, branch "1", the method is continued with a step 380 in which the first switching unit 215 is open (state "0") and the second switching unit 225 (state "1") is closed.

After a sufficient waiting period (step 390) of a minimum of 50 microseconds, for example, which corresponds to three times an output filter time constant of the voltage measuring circuit 230, the voltage present at the output 230a is measured in a step 400.

The measured voltage is compared to a comparative value in a step 410, the comparative value being determined as a function of the measured voltage that is present (step 310) and the determined component voltage limit (step 330) (see table). If the two values do not agree within an allowable tolerance, branch "0", the method is ended in step 430 and the electric machine and/or the system containing it are/is brought into a secure state.

If the values agree within the tolerance, branch "1", the method is continued with a step 410 in which the overvoltage protection circuit is assessed as functional, and an appropriate measure is optionally carried out, which in particular involves enabling the subsequent operation.

The invention claimed is:

1. A method for checking an overvoltage protection circuit (200) for an electric machine (100),
    wherein the overvoltage protection circuit (200) has a series connection of at least two overvoltage protection units (210, 220),
    wherein a switching unit (215, 225) is connected in parallel to each of the at least two overvoltage protection units (210, 220), so that the particular overvoltage protection unit (210, 220) is bridged by closing the switching unit (215, 225),
    wherein each of the at least two overvoltage protection units (210, 220) includes at least one overvoltage protection component (211, 221, 222),
    wherein each overvoltage protection component (211, 221, 222) limits a voltage, dropping across this component, to a component voltage limit,
    wherein at least one of the at least two overvoltage protection units (210, 220) includes at least two overvoltage protection components (211, 221, 222),
    wherein a voltage tap (230a) is provided between two of the at least two overvoltage protection components (211, 221, 222) of the at least one overvoltage protection unit (220),
    comprising the steps:
        detecting a voltage present at the overvoltage protection circuit (200),
        switching the at least two switching units (215, 225) into at least two different switching configurations and determining a measured value of a voltage present at the voltage tap (230a) in each of the at least two different switching configurations,
        comparing the at least two measured values in each case to an associated comparative value that is determined as a function of the voltage present at the overvoltage protection circuit (200) and the component voltage limits,
        determining the functionality of the overvoltage protection circuit (200) based on at least one comparison result.

2. The method according to claim 1,
    wherein the determining of the functionality of the overvoltage protection circuit (200) based on the at least one comparison result includes:
        determining that the overvoltage protection circuit (200) is not functional if at least one measured value does not agree with the associated comparative value within an allowable tolerance.

3. The method according to claim 2, further comprising carrying out a measure if it is determined that the overvoltage protection circuit (200) is not functional.

4. The method according to claim 1,
    wherein the determining of the functionality of the overvoltage protection circuit (200) based on the at least one comparison result includes:
        determining that the overvoltage protection circuit (200) is functional if all measured values agree with the associated comparative value within an allowable tolerance.

5. The method according to claim 1,
    wherein the at least two different switching configurations are selected from a first switching configuration in which a first of the at least two switching units (215, 225) is closed and a second of the at least two switching units (215, 225) is open, a second switching configuration in which the first of the at least two switching units (215, 225) is open and the second of the at least two switching units (215, 225) is closed, and a third switching configuration in which the first of the at least two switching units (215, 225) is open and the second of the at least two switching units (215, 225) is open.

6. The method according to claim 1, further comprising: determining the component voltage limits of the overvoltage protection components (211, 221, 222).

7. The method according to claim 1, further comprising: determining a temperature,
    determining the component voltage limits of the overvoltage protection components (211, 221, 222) as a function of the temperature.

8. The method according to claim 1, wherein the overvoltage protection components (211, 221, 222) includes a diode, in particular a suppressor diode or Zener diode.

9. A processing unit that is configured to carry out a method according to claim 1.

10. A converter arrangement that includes a converter circuit (140) with two direct voltage terminals (161, 162) and a plurality of alternating voltage terminals (163), an overvoltage protection circuit (200) that is connected between the two direct voltage terminals, and a processing unit,
    wherein the overvoltage protection circuit (200) has a series connection of at least two overvoltage protection units (210, 220),
    wherein a switching unit (215, 225) is connected in parallel to each of the at least two overvoltage protection units (210, 220), so that the particular overvoltage protection unit is bridged by closing the switching unit (215, 225),
    wherein each of the at least two overvoltage protection units (210, 220) has at least one overvoltage protection component (211, 221, 222),
    wherein each overvoltage protection component (211, 221, 222) limits a voltage, dropping across this component, to a component voltage limit, wherein at least one of the at least two overvoltage protection units (210, 220) has at least two overvoltage protection components (211, 221, 222),
wherein a voltage tap (230*a*) is provided between two of the at least two overvoltage protection components (211, 221, 222) of the at least one overvoltage protection unit (220).

11. The converter arrangement according to claim 10, wherein the overvoltage protection circuit (200) has a series connection of exactly two overvoltage protection units (210, 220).

12. The converter arrangement according to claim 11, wherein a first overvoltage protection unit (210) has exactly one overvoltage protection component (211), and a second overvoltage protection unit (220) has exactly two overvoltage protection components (221, 222).

13. The converter arrangement according to claim 12, wherein the voltage tap (230*a*) is situated between the two overvoltage protection components (221, 222) of the second overvoltage protection unit (220).

14. The converter arrangement according to claim 10, wherein the overvoltage protection circuit (200) has exactly one voltage tap (230*a*).

\* \* \* \* \*